United States Patent
Hosseini Hashemi et al.

(10) Patent No.: US 10,907,262 B2
(45) Date of Patent: Feb. 2, 2021

(54) MEMBRANE-LESS ELECTROLYZER

(71) Applicant: ECOLE POLYTECHNIQUE FEDERALE DE LAUSANNE (EPFL), Lausanne (CH)

(72) Inventors: Seyyed Mohammad Hosseini Hashemi, Renens (CH); Jae-Woo Choi, Exton, PA (US); Demetri Psaltis, Préverenges (CH); Miguel Antonio Modestino, New York, NY (US)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 201 days.

(21) Appl. No.: 15/520,096

(22) PCT Filed: Oct. 19, 2015

(86) PCT No.: PCT/IB2015/058050
§ 371 (c)(1),
(2) Date: Apr. 19, 2017

(87) PCT Pub. No.: WO2016/063206
PCT Pub. Date: Apr. 28, 2016

(65) Prior Publication Data
US 2017/0314146 A1    Nov. 2, 2017

(30) Foreign Application Priority Data

Oct. 20, 2014 (WO) .................. PCT/IB2014/065481

(51) Int. Cl.
*C25B 9/06* (2006.01)
*C25B 15/08* (2006.01)
*C25B 1/06* (2006.01)

(52) U.S. Cl.
CPC .................. *C25B 9/06* (2013.01); *C25B 1/06* (2013.01); *C25B 15/08* (2013.01); *Y02E 60/36* (2013.01)

(58) Field of Classification Search
None
See application file for complete search history.

(56) References Cited

U.S. PATENT DOCUMENTS 5,534,120 A     7/1996   Ando et al.
7,635,530 B2   12/2009   Kenis et al.
(Continued)

FOREIGN PATENT DOCUMENTS

EP        0565330 A1      10/1993
WO    WO 2005104279      11/2005
(Continued)

OTHER PUBLICATIONS

International Search Report of PCT/IB2015/058050 dated Jan. 20, 2016.
(Continued)

*Primary Examiner* — Nicholas A Smith
(74) *Attorney, Agent, or Firm* — Andre Roland S.A.; Nikolaus Schibli (57) ABSTRACT

The present invention concerns a membrane-less electrolyzer comprising a fluidic channel for receiving an electrolyte fluid; a first electrode and a second electrode located inside the fluidic channel, the first and second electrode permitting to extract a first gas and a second gas inside the fluidic channel from the electrolyte fluid, the first electrode and second electrode being separated by solely a surrounding fluid in the fluidic channel or the electrolyte; and a first fluidic transport channel for transporting the first gas to a first outlet and a second fluidic transport channel for transporting the second gas to a second outlet.

22 Claims, 10 Drawing Sheets

(56) References Cited

U.S. PATENT DOCUMENTS

| | | | |
|---|---|---|---|
| 8,632,927 B2 | 1/2014 | Wilkinson et al. | |
| 2005/0074663 A1 | 4/2005 | Farneth et al. | |
| 2006/0003217 A1* | 1/2006 | Cohen | H01M 8/006 |
| | | | 429/428 |
| 2011/0100328 A1* | 5/2011 | Paul | C25B 1/04 |
| | | | 123/445 |
| 2012/0063971 A1 | 3/2012 | Carlo et al. | |
| 2012/0149789 A1 | 6/2012 | Greenbaum | |
| 2012/0177881 A1 | 7/2012 | Lee et al. | |
| 2012/0258283 A1 | 10/2012 | Sohn et al. | |
| 2014/0291165 A1 | 10/2014 | Morel | |

FOREIGN PATENT DOCUMENTS

| | | |
|---|---|---|
| WO | WO 2006031268 A2 | 3/2006 |
| WO | WO 2006031268 A3 | 3/2006 |

OTHER PUBLICATIONS

Written Opinion of the International Search Authority dated Jan. 20, 2016.

Hashemi, S. M. H., Modestino, M. A., & Psaltis, D. (2015). A membrane-less electrolyzer for hydrogen production across the pH scale. Energy & Environmental Science, 8(7), 2003-2009.

Rule 94(3) Notification dated Mar. 8, 2019 from the European Patent Office (EPO) for Application No. 15802199.8.

* cited by examiner

MEMBRANE-LESS ELECTROLYZER

CROSS-REFERENCE TO RELATED APPLICATIONS

This application is a U.S. national stage application of PCT/IB2015/058050 filed on Oct. 19, 2015 designating the United States, and claims the benefit of foreign priority to the international patent application PCT/IB2014/065481 filed Oct. 20, 2014, the entire contents of both documents are incorporated herein by reference.

FIELD OF THE INVENTION

The present invention concerns an electrolyzer or a device for carrying out electrolysis of a fluid to decompose the fluid into at least a first and a second gas. In particular, the present invention concerns a novel electrolyzer without ion exchange membranes (membrane-less electrolyzer), for example, a membrane-less water electrolyzer.

An ion conductive membrane is considered as an essential component in water electrolyzers. Since its introduction in the 1960s, Nafions has become the benchmark proton conducting membrane in both industrial and academic settings. Despite its high price, limited life time and limitation to strongly acidic pH values, researchers have adopted this material mainly due to its superior stability and ion conductivity.

The membrane-less electrolyzer according to the present invention schemes addressed the above challenges demonstrates for the first time a membrane-less device, which can operate robustly and continuously with various catalysts and electrolytes across the pH scale, while at the same time generating for example hydrogen gas streams whose oxygen content is well below the safety limit.

BACKGROUND OF THE INVENTION

Hydrogen gas is a very attractive clean fuel. A major problematic issue, however, with Hydrogen gas as a clean fuel is its expensive production process and storage.

Today, the most widely used proton exchange membrane is produced under the commercial name of Nafion and is expensive. It currently costs approximately 200 Euros for a 30 cm by 30 cm sheet of 175 µm thickness. Furthermore, this membrane has a limited life time of one to two years which imposes further maintenance and integration costs.

The present invention permits to reduce significantly the cost of conventional electrolyzers for producing Hydrogen and other gases by removing the need for integration of an ion exchange membrane in between the anode and the cathode electrodes.

The membrane-free device of the present invention can surpass the classic ones in terms of lifetime, cost, and efficiency if designed optimally as set out herein. Electrical insulation and gas impermeability of the flow plates are the only material requirements for manufacturing these novel electrolyzers of the present invention.

Advantageously, the device can be scaled up at low cost by employing appropriate fabrication technology.

The device can be produced with a high resolution (~20 µm) 3D printer. The use of such a 3D printer is particularly useful for the second embodiment of the present invention illustrated in FIGS. 3A and 3B.

Hydrogen gas is a clean alternative fuel which has the potential to redefine our fossil-fuel based infrastructure, if its production cost reached levels competitive with conventional energy resources. As the only emission from hydrogen-based energy production is water, the adoption of this fuel can alleviate many environmental concerns. Furthermore, the use of hydrogen as a vehicle for energy storage can enable the large-scale deployment of renewable energy sources such as solar and wind which suffer from their intermittent availability.

Currently, most of the hydrogen produced in the world comes from steam reforming of natural gas, a process that intrinsically releases at least 1 molecule of $CO_2$ for every 3 molecules of $H_2$ produced. A truly clean alternative is to use renewable energy sources, to drive water electrolysis systems and store the excess energy as $H_2$ fuel. State-of-the-art electrolysis systems are based on membrane electrode assemblies (MEAs) that take advantage of low ionic resistance through Nafion® membranes that separate the hydrogen and oxygen evolution sites. Although membranes allow for production of nearly-pure gas streams and the operation of electrolyzers at high current densities, the strongly acidic nature of Nafion requires the incorporation of acid-stable catalysts that are based on noble metals, i.e. Pt and Ir. The lack of stable and high-performing membranes that operate under basic and near-neutral conditions has precluded the incorporation of practical earth-abundant water splitting catalysts or photocatalytic materials into deployable devices, as they have limited stability under acidic electrolytes. Research on anion-conducting membranes have led to promising alternatives for operation at high pH, but their implementation in electrochemical devices lags behind Nafion in terms of conductivity and stability. Even more complex issues arise for devices operated under near-neutral conditions.

Membrane-less electrolysis allows for the operation of devices at any pH, reduces the complexity by the elimination of separation membranes and decreases the ionic resistance thanks to the higher ion-mobility in liquid electrolytes.

Figure 2:
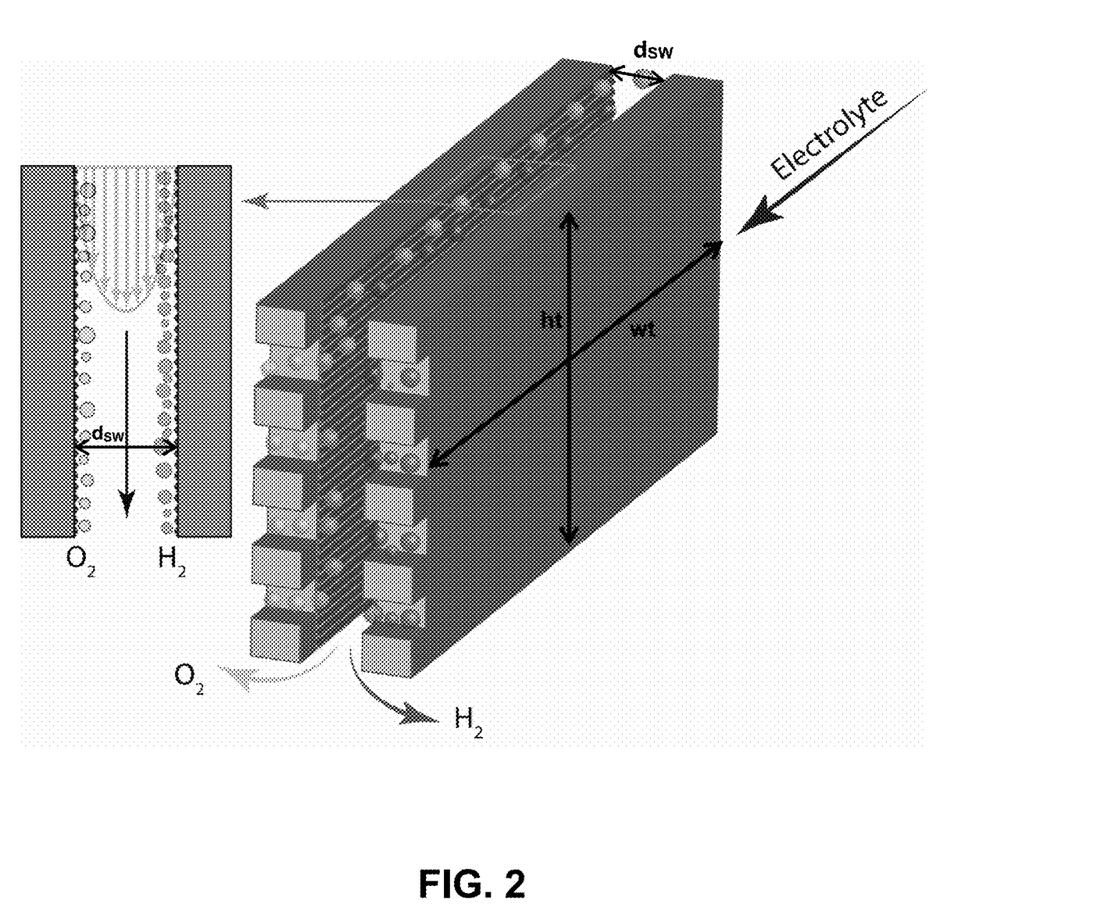
FIG. 2 is a schematic diagram of an exemplary membrane-less electrolyzer according to the present invention.

To mitigate gas crossover in the membrane-less scheme according to the present invention, a fluid dynamic approach is implemented in order to control the position and trajectory of gas bubbles as they evolve from electrodes (see for example FIG. 2).

SUMMARY OF THE INVENTION

The present invention relates to an electrolyzer or a device for carrying out electrolysis of a fluid to decompose the fluid into at least a first and a second gas.

The present invention further relates to an electrolyzer or a device to decompose a reactant in the fluid stream into oxidation and reduction products at the anode and cathode respectively. For example, a reactant in the fluid stream is decomposed into at least a gas and a fluid.

In particular, the present invention concerns a novel electrolyzer without ion exchange membranes (membrane-less electrolyzer), for example, a membrane-less water electrolyzer.

The electrolyzer according to the present invention includes no ion exchange membrane located between the electrodes of the device. That is, there is no solid or semi-solid ion exchange membrane located between the electrodes or separating the electrodes.

A schematic diagram of an exemplary membrane-less water electrolyzer and electrolysis according to the present invention is shown in FIG. 2. Two substantially parallel plate electrodes include coatings of, for example, hydrogen and oxygen evolution catalysts respectively and are, for example, separated by less than few hundreds of micrometers.

An electrolyte flows between the catalyst coated plates and moves the evolved gases forward with each gas staying close to the corresponding catalyst surface. Each of the produced gas streams is collected at dedicated outlets. Stacks of these planes in horizontal can, for example, be used for higher throughput.

Figure 3:
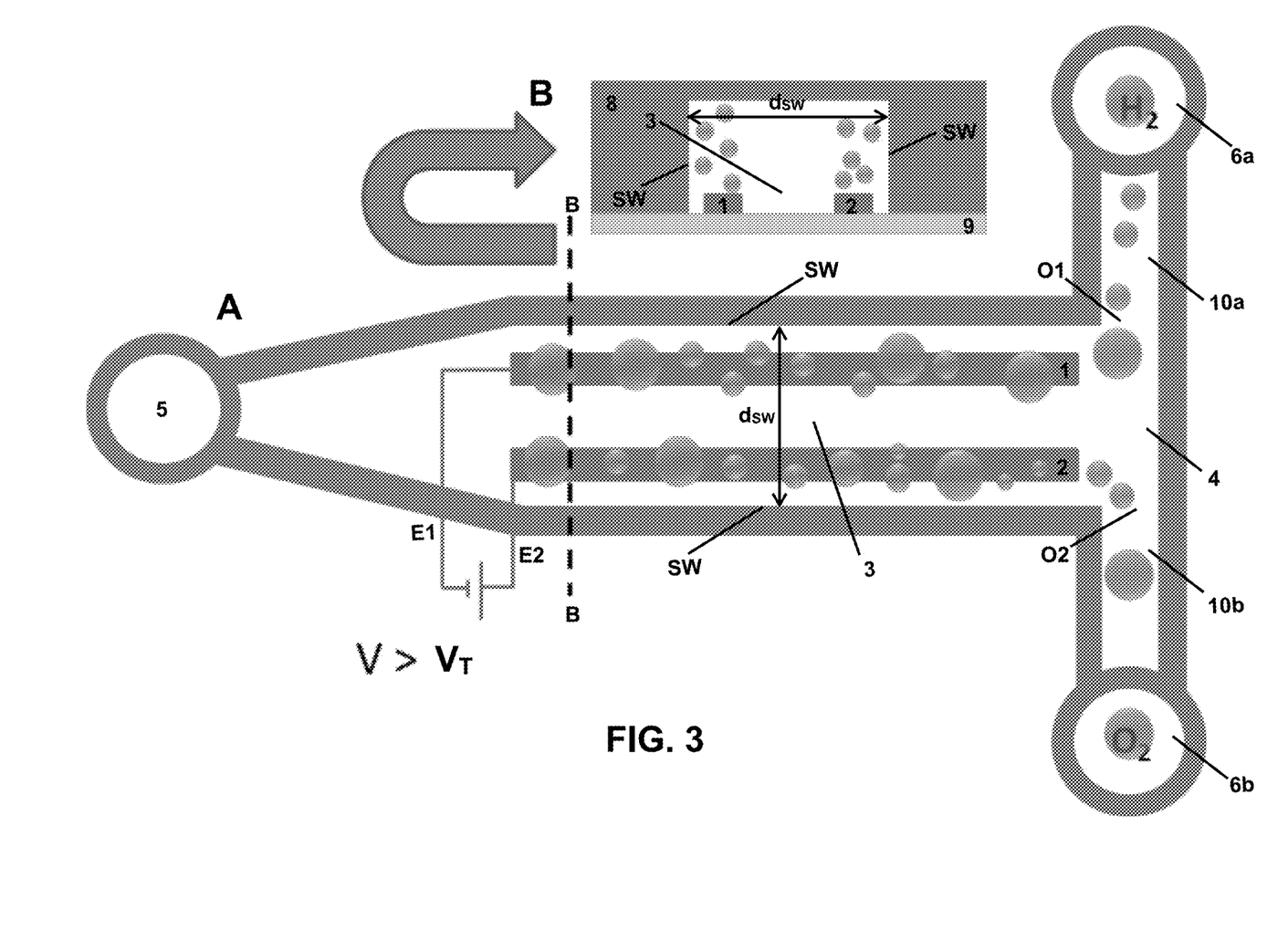
FIGS. 3A and 3B show a schematic open top-view of the in-plane electrolyzer according to the present invention as well as a side view taken along B-B, this electrolyzer can be produced using the exemplary fabrication method illustrated in FIG. 1.
Figure 4:
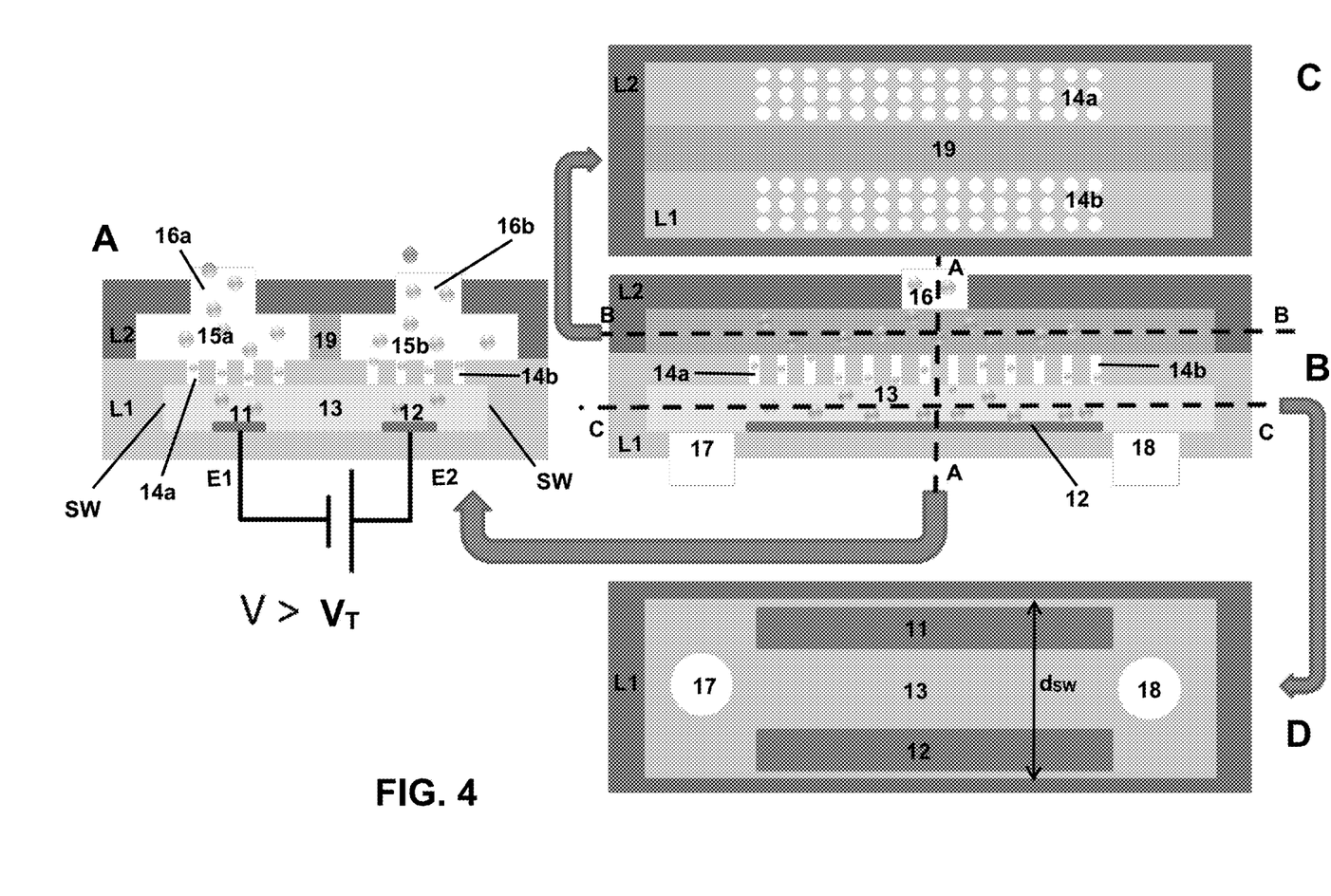

Another exemplary embodiment/design of a membrane-less electrolyzer shown in FIGS. 3A and 3B according to the present invention is substantially planar, using, for example, a substantially rectangular channel or microchannel which then gets divided into two branches in a T-junction.

There are two electrodes each one lying at one side of the microchannel. As the electrolyte flows over the electrodes, a gas, for example Hydrogen or Oxygen, is evolved over each of them, and an inertial force exerted on the gas bubbles by the flow of the electrolyte prevents their convective mixing.

Experimental results show less than 4% crossover of Hydrogen gas into Oxygen gas's storage at current densities as high as 150 mA/cm$^2$ and electrolyte flow rates through the microchannel as low as 12 ml/hour.

Another embodiment/design of the present invention concerns a 3-dimensional design using microstructures at the top surface of the electrolyte channel. When the gases move up due to the buoyancy effect, they "see" the porous structures and enter the second layer on top. In this top layer, the space above the electrodes is physically divided into two by a (solid) wall; one space for the Oxygen gas and the other for the Hydrogen gas.

According to another aspect of the present invention, this above mentioned 3D design but without the electrodes constitutes a degassing device and can be used in all potential applications where degassing of a liquid flow is necessary.

The only material consideration to take into account is for the cases where collection of unmixed gases is important, such as in an electrolyzer. In such applications, the use of an impermeable material is preferable.

The present invention concerns an electrolyzer, an array including a plurality of such electrolyzers, a method of operating a membrane-less electrolyzer, and degassing device.

Other advantages are provided by the features of the dependent claims.

DESCRIPTION OF THE DRAWINGS

The above object, features and other advantages of the present invention will be best understood from the following detailed description in conjunction with the accompanying drawings, in which:

FIGS. 4A, 4B, 4C, and 4D show a schematic of a 3D design according to another embodiment of the present invention including two cross sectional side views FIGS. 4A and 4B, where FIG. 4A is a cross-sectional view taken along A-A of FIG. 4B, and including two cross sectional top views FIGS. 4C and 4D taken along B-B and C-C of FIG. 4B, respectively;

FIGS. 9A to 9D show electrochemical characterization results of the device of FIGS. 3A and 3B where

DETAILED DESCRIPTION OF THE INVENTION

Figure 1:
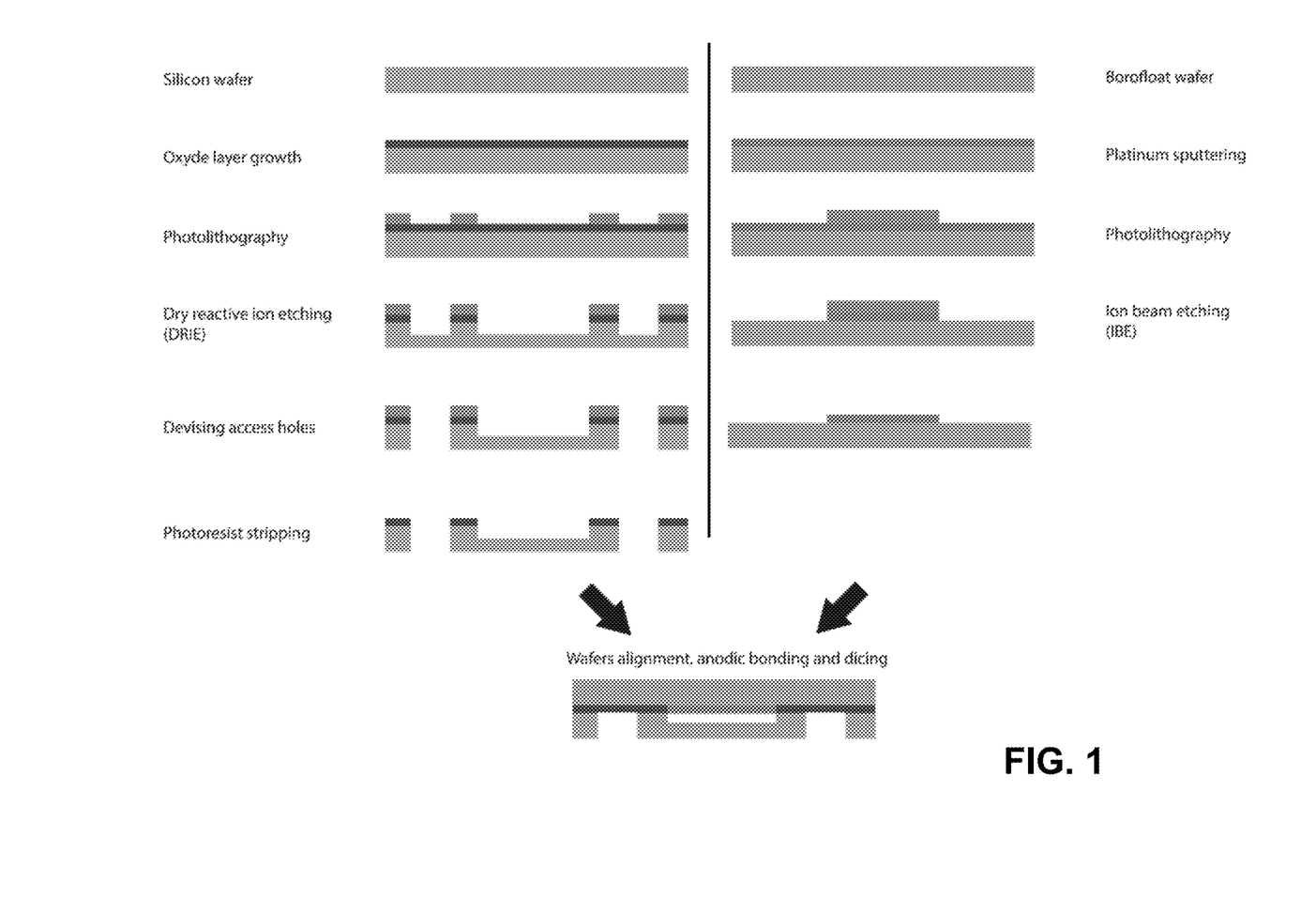
FIG. 1 illustrates a fabrication procedure according to the present invention for an in-plane micro-electrolyzer according to the present invention.

An exemplary method for producing the electrolyzer according to a first embodiment of the present invention is illustrated in FIG. 1.

Electrodes and fluidic channels are separately developed on two separate wafers in a clean room.

The exemplary platinum electrodes (for example, 200 nm thick, 70 μm wide and 10 mm long) are patterned on, for example, a Pyrex glass wafer using photolithography and Ion Beam Etching (IBE) techniques (right side of FIG. 1). Alternatively, the electrodes can be deposited on the side walls SW (see FIGS. 3A and 3B) of the fluidic channel in the silicon wafer (see left side of FIG. 1).

Use of Platinum (as a catalyst) is as an example and not necessary for the electrodes as their material can be chosen from other materials of the library of Hydrogen and Oxygen evolution catalysts.

As illustrated on the left side of FIG. 1, the fluidic channels are made through Deep Reactive Ion Etching (DRIE) of a photolithographically patterned silicon wafer, for example.

The width and length of the main channel and each of the T-junction branches are, in this realization of this exemplary embodiment, 275 μm, 12 mm, 100 μm and 5 mm, respectively (see FIGS. 3A and 3B). The depth of all channels is, for example, 60 µm. These are exemplary values and it should be understood that the device is not limited to such values. The silicon wafer's surface is rendered non-conductive by deposition of a thin oxide film prior to this substrate patterning.

In the exemplary embodiment illustrated in FIGS. 3A and 3B (which can be produced according to the exemplary fabrication method illustrated in FIG. 1), the electrolyzer includes a cathode electrode 1, an anode electrode 2, a fluidic channel (or microchannel) 3 and a junction 4 that is substantially T-shaped, as mentioned previously.

The junction 4 is a means or mechanism for directing the two produced gases in directions so as to facilitate collection of the individual gases.

The fluidic channel 3 may have another forms or shape and is not limited to the illustrated rectangular shape.

Moreover, the device may include a different shaped junction 4 and the junction 4 is not necessarily T-shaped but can have other shapes, for example Y-shaped.

Alternatively, the device does not necessarily require the presence of a T-junction. The device may instead comprise a first opening or through-hole O1 and a second opening or through-hole O2 each respectively passing through a wall of the device and situated at the extremity of the electrodes 1, 2 through which a gas and electrolyte exit the device.

The first opening or through-hole O1 and the second opening or through-hole O2 each define a transport channel through the device wall through which a gas and electrolyte pass, and furthermore define an outlet through which a gas and electrolyte exit the device.

The electrolyzer further includes an electrolyte inlet 5, an electrolyte and Hydrogen outlet 6a, and an electrolyte and Oxygen outlet 6b.

FIG. 3B shows the structured silicon wafer 8 enclosing the cathode 1 and anode 2 electrodes formed on the Pyrex wafer 9 and defining the fluidic microchannel 3.

The cathode electrode 1 and the anode electrode 2 are located inside the microfluidic channel 3 and permit to extract a first gas and a second gas inside the microfluidic channel 3 from an electrolyte fluid inside the microfluidic channel 3.

The cathode electrode 1 and the anode electrode 2 are separated by solely a surrounding fluid (for example air) in the microfluidic channel 3 or the electrolyte fluid in the microfluidic channel 3.

As can be seen in FIGS. 3A and 3B, the electrolyzer does not include a (solid or semi-solid) ion exchange membrane or diaphragm in microfluidic channel 3 or the device to physically isolate the gas producing cathode 1 and the gas producing anode 2 form one another or to physically isolate the gases produced by or on the cathode and the anode from one another. The electrolyzer is a membrane-less electrolyzer.

The T-junction 4 includes a first fluidic transport channel 10a for transporting the first gas to the first gas outlet 6a and a second fluidic transport channel 10b for transporting the second gas to the second gas outlet 6b.

The microfluidic channel 3 is an enclosed microfluidic channel, and the first and second fluidic transport channels 10a, 10b are enclosed fluidic channels for transporting and guiding the first and second gases to the outlets 6a, 6b.

The distance between electrodes should preferably be optimized to minimize gas diffusion across the channel 3. In the first embodiment, this distance between electrodes is 105 µm. It should be noted that both this inter-electrode distance and the distance $d_{SW}$ between side walls SW of the fluidic channel 3 (the inter-electrode distance and the distance $d_{SW}$ is approximately similar or identical when the electrodes are located on the sides walls SW) is the only dimension that needs to remain relatively small in order to provide a laminar electrolyte flow that provides a steep velocity flow gradient of the electrolyte (see also flow arrows in FIGS. 7 and 2) to reduce or minimize mixing of the gases.

Figure 7:
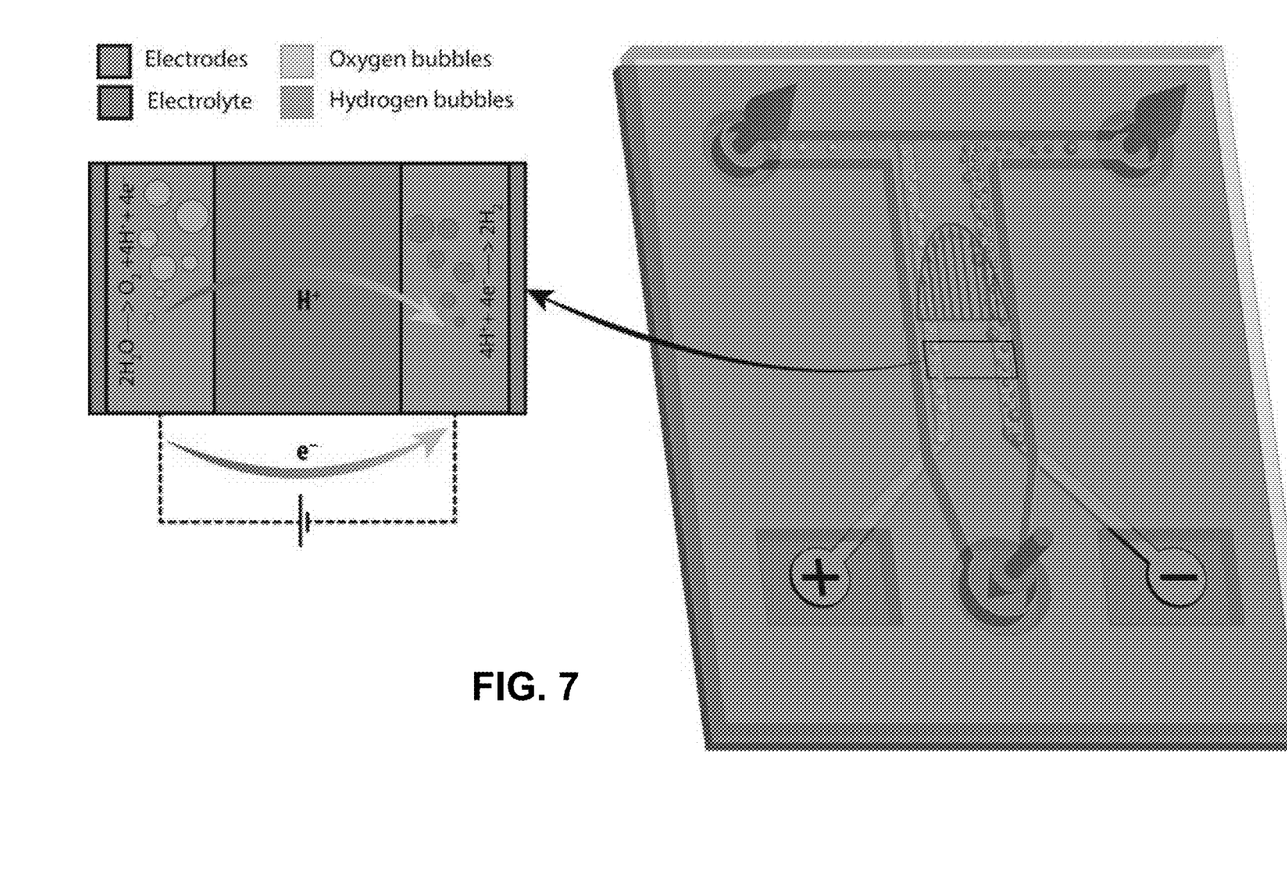
FIG. 7 is a schematic of the electrolyzer of FIGS. 3A and 3B.

Preferably, the flow profile through the fluidic channel 3 has a hyperbolic profile across the fluidic channel 3 as illustrated by the flow arrows in FIGS. 7 and 2. This is true for all embodiments.

Upon satisfying this inter-electrode distance condition or distance $d_{SW}$ between side walls SW condition, the other device dimensions (see for example FIG. 2, height ht, width wt) can be increased by several orders of magnitudes compared to the inter-electrode distance or distance $d_{SW}$ depending on the device design and desired application.

It should be noted that although this embodiment for practical reasons uses a device of the above mentioned specific dimensions, the device can be scaled to a device where large-area parallel plate electrodes are implemented (see for example FIG. 2). Such large-area side walls having a narrow channel can be coated with appropriate catalysts to achieve higher throughput.

The distance d between electrodes or distance ($d_{SW}$) between side walls SW of the fluidic channel can have a value d where d is as follows: 5 mm≥d≥50 µm, or 500 µm≥d≥50 µm, or 200 µm≥d≥50 µm.

Fluidics access ports 5, 6a, 6b and electrode access ports E1, E2 are made by cutting through the wafer using, for example, a diamond scribe.

As shown at the bottom of FIG. 1, the two wafers are then aligned in a mask aligner machine and bonded together using standard anodic bonding technique.

Finally, for example, polydimethysiloxane (PDMS) pieces (5×5×5 mm³) are plasma bonded on top of the fluidic ports 5, 6a, 6b in order to provide a flexible bed for tubing connections to these ports. The tubing connections provide electrolyte fluid into the electrolyzer and the microfluidic channel 3 through access port 5 and remove electrolyte fluid and gas from the electrolyzer via ports 6a and 6b.

There are five ports in total, three for fluidics~one inlet port 5 for the electrolyte, plus one outlet port 6a, 6b for each of the two gases and the electrolyte~and two ports E1, E2 for the electrodes. The fabrication procedure is shown in FIG. 1.

Both electrodes 1, 2 lie at the bottom of the fluidic channel 3, each one close to a side wall SW (FIGS. 3A and 3B).

The distance between each electrode 1, 2 and the side wall SW of the fluidic channel 3 is, for example, 15 µm. When enough voltage (operational voltage equal or greater than a threshold voltage $V_T$)~for example 2.3 V to get a current density of 72 mA/cm²—is applied, gas starts evolving at the surface of each electrode 1, 2. The gas bubbles reach to a definite size, detach from the surface of the electrode and move along the main channel 3 and each T-junction branch 10a, 10b due to the drag force of the electrolyte flow.

The drag force guiding the first gas in the microfluidic channel 3 to first fluidic transport channel 10a, and guiding the second gas in the microfluidic channel 3 to the second fluidic transport channel 10b includes the force generated by the guided flow of the electrolyte fluid in the enclosed microfluidic channel 3 between the inlet 5 and the outlets 6a, 6b.

An electrolyte fluid insertion and removal system (unillustrated) of the electrolyzer is configured to insert the electrolyte fluid through inlet 5 and remove an electrolyte fluid through outlets 6a, 6b. All embodiments of the present invention may include such a system.

The system can push the fluid through into the inlet 5 and through the microfluidic channel 3 and out the outlets 6a, 6b; or alternatively use suction to aspire the fluid out through the outlets 6a, 6b and inwards through the inlet 5.

This electrolyte fluid insertion and removal system includes for example a pump connected to the inlets and outlets using for example tubing to carry out the electrolyte fluid insertion and removal. The pumping power of the pump can be varied, that is increased or decreased, to vary the amount of fluid flowing through the device and the fluid flow velocity in the device.

This system acts as a means or a mechanism for guiding the first gas in the microfluidic channel 3 to the first outlet 6a, and for guiding the second gas in the microfluidic channel 3 to the second outlet 6b.

The electrolyte fluid insertion and removal system and electrolyzer are configured to generate or provide a laminar flow of the fluid through the fluidic channel 3 and a hyperbolic velocity flow profile across the fluidic channel 3 as illustrated by the flow arrows in FIGS. 7 and 2. This system is configured to increase the flow velocity of the electrolyte while a laminar flow and hyperbolic velocity flow is maintained in the electrolyzer. This can be achieved by having a small hydraulic diameter of channel 3 (small distance d between electrodes or small distance ($d_{SW}$) between side walls SW of the fluidic channel). This small diameter provides a low Reynolds number.

The Reynold's number is well known to a skilled person in the art and is a dimensionless number which is equal to the product of the hydraulic diameter of channel 3, with the linear velocity of the fluid divided by the kinematic viscosity of the fluid.

Moreover, the hyperbolic profile of the electrolyte flow velocity creates an inertial force in the cross flow direction pointing towards the fluidic channel walls SW. This force keeps each stream of gas bubbles close to the corresponding wall and therefore, unmixed until they go into opposite directions to outlets, via for example, the T-junction branches and get separated.

The first and second gases are confined to opposing sides of the microfluidic channel 3.

The predominant crossover mechanism is diffusion, whose magnitude can be controlled through minimization of the residence time of bubbles in the device via increasing flow rate of the electrolyte. This is shown schematically in FIGS. 3A and 3B. Consequently, the system is configured to modify the flow rate of the electrolyte fluid to increase the flow rate and set it at a value that minimizes or eliminates crossover of the gases via diffusion.

FIG. 1 illustrates an exemplary method for producing the electrolyzer according to the present invention. It is, however, not necessary to fabricate the device in the clean room and it can for example also be produced using machining, moulding or with a high resolution (~20 μm) 3D printer.

FIG. 7 is a schematic of the electrolyzer design of FIGS. 3A and 3B where the electrolyte is water. Hydrogen gas evolves at the cathode (negative electrode) and oxygen gas at the anode (positive electrode). The two gas streams do not experience any convective mixing because of inertial lift forces that push them towards the neighboring walls. The only mixing mechanism is diffusion of dissolved gases which is minimal at high flow rates.

Figure 8:
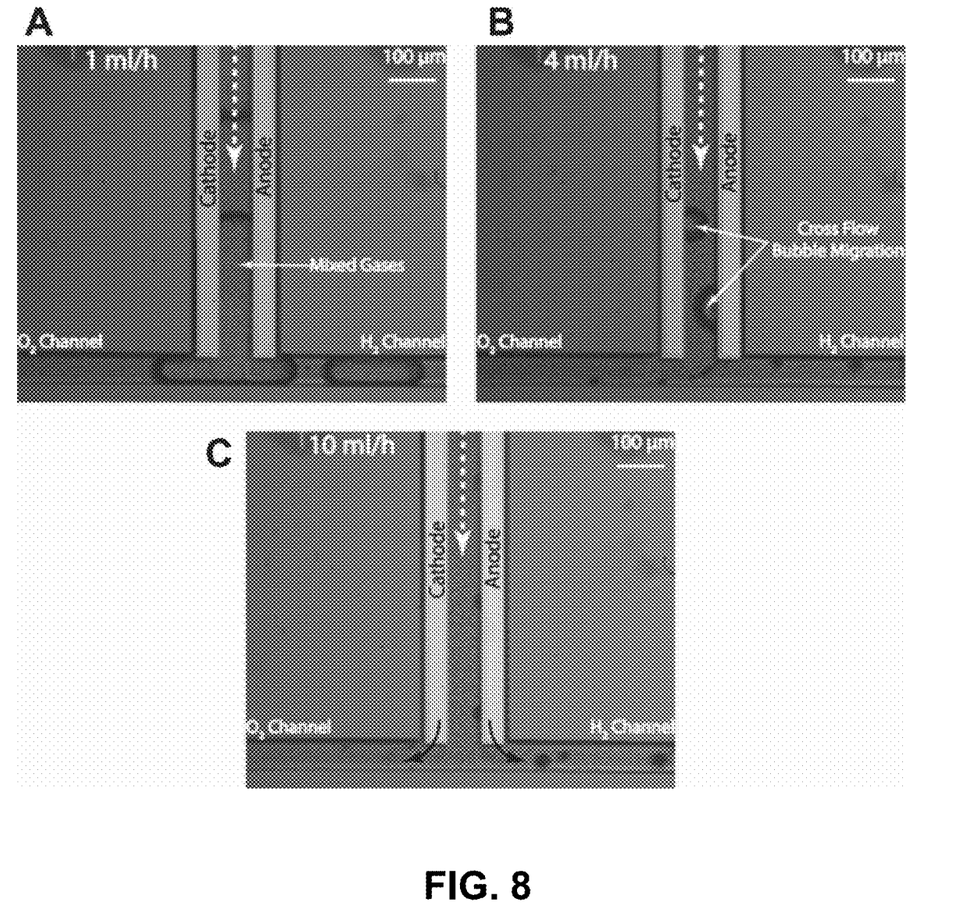
FIGS. 8A, 8B, and 8C show images of the T-junction of the electrolyzer of FIGS. 3A and 3B taken during device operation at a predetermined current density device and different flow rates.

Snapshots of the T-junction are presented in FIGS. 8A to 8C during operating at different flow rates. Images of the T-junction of FIGS. 8A to 8C are taken while the device is working at a current density of 143 mA/cm$^2$ and different flow rates. The two visible parallel bands are the cathode and the anode, each lying next to a side wall. In FIG. 8A, at flow rates of 1 ml/h, the fluidic drag force is so small that the bubbles from the two electrodes grow, coalesce and move out of the device through the two outlets in a mixed form. In FIG. 8B, at 4 ml/h, the size of the bubbles is reduced and some of them do not coalesce, although the flow speed is not enough for inertial migration to happen and keep the streams separated. In FIG. 8C, at 10 ml/h, gas bubbles are not present in the center of the main channel and each gas stream flows into dedicated outlets. The inertial lift force is sufficient in this case to keep the bubbles close to the side walls and unmixed.

As the flow rate increases, the size of the bubbles becomes smaller due to the larger drag force at the liquid-gas interface, while the increased inertial lift force keeps the oxygen and hydrogen bubble streams apart. These flow rate effects also fundamentally change the product mixing mechanism in the device. At low flow rates, convective mixing of bubbles migrating towards the center of the channel dominate the product crossover, while for high flow rates the diffusion of dissolved gases across the electrodes become dominant. This illustrates the important role of inertial lift force in the separation of the two gas streams at high velocities.

The membrane-less device shows stable operation at high current densities over the broad range of pH. The electrochemical performance, as investigated by the device current-voltage characteristics, shows over 300 mA/cm$^2$ current density with an operating cell voltage of 2.6 V and 14 ml/h flow rate of 1 M sulfuric acid over platinum electrodes. This value can be further improved by integration of a better oxygen evolving catalyst such as iridium oxide and also nanostructuring of the flat electrodes.

Figure 9:
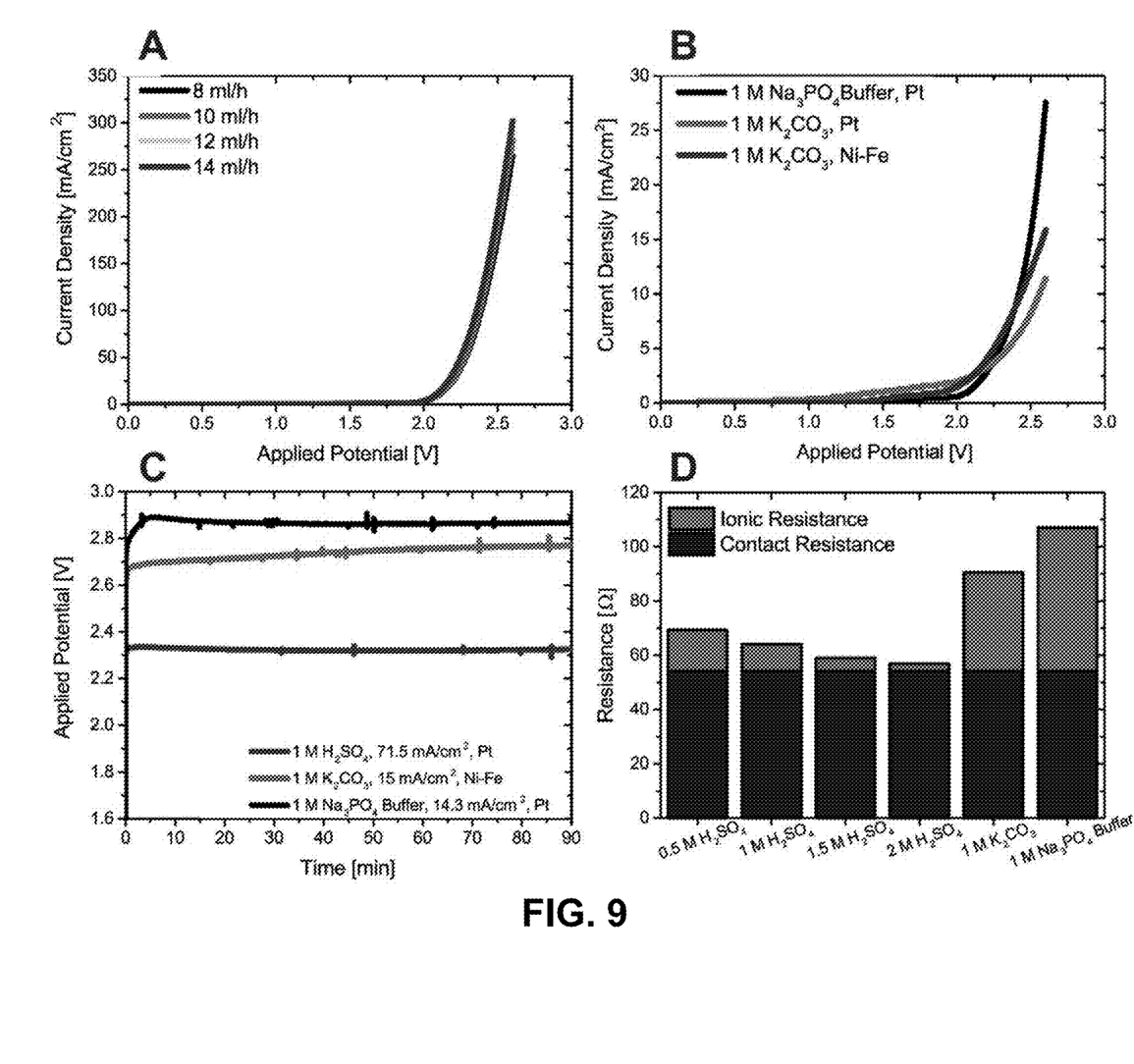
FIG. 9A shows current density as a function of operational voltage for 1 M sulfuric acid at different flow rates.
FIG. 9B shows J-V characteristics in 1 M Phosphate buffer and Potassium Carbonate with two different catalysts, the current density is smaller than that for acid electrolytes as platinum operates at higher efficiencies at low pH, and the results also reveal that Ni—Fe outperforms Pt at high pH values.
FIG. 9C shows that the cell voltage remains constant for more than 1.5 hours of operation in 1 M sulfuric acid, Phosphate buffer, and Potassium Carbonate for both Pt and Ni—Fe as catalyst.
FIG. 9D shows Ohmic resistance for different electrolytes obtained from impedance spectroscopy, calculations show that the ohmic resistance in the device is mostly due to contact resistance.

As presented in FIG. 9A, the effect of the flow rate on the current density is minimal in the range between 8 to 14 ml/h, since the fluidic drag force is high enough to detach bubbles while they are small, therefore, minimizing the mass transport limitations due to bubbles attached to the electrodes' surface. Additionally, the electrolyzer's behavior in basic and neutral pH electrolytes are shown in FIG. 9B for a flow rate of 12 ml/h. Operating under non-acidic electrolytes is attractive because it opens the possibility to incorporate earth abundant catalysts. To this end, the performance of an electrolyzer with Nickel-Iron (81% Ni, 19% Fe) catalysts was also investigated and reported in FIG. 9B.

Furthermore, the device works stably over the course of hours with different electrolytes and catalysts, as shown in FIG. 9C. This stable performance is even observed in a Phosphate buffer with pH of 6.6 after an initial equilibrium period of less than few minutes when ionic gradients at the surface of electrodes are expected to be formed.

Lastly, it can be inferred from FIG. 9D that the losses are mostly due to reaction kinetics, since ohmic losses stay well below 140 mV, with less than 22 mV arising from solution's ionic resistance at current densities up to 304 mA/cm$^2$. It is worth noting that the conductivity of 1 M sulfuric acid is 0.4 S/cm at 25° C., whereas this parameter for Nafion measured in 1 M sulfuric acid at 25° C. is reported to fall in the range between 0.08 to 0.16 S/cm. This difference shows that the membrane-less device of the present invention would advantageously outperform in efficiency a Nafion-based analogue while still suppressing the gas crossover.

Figure 10:
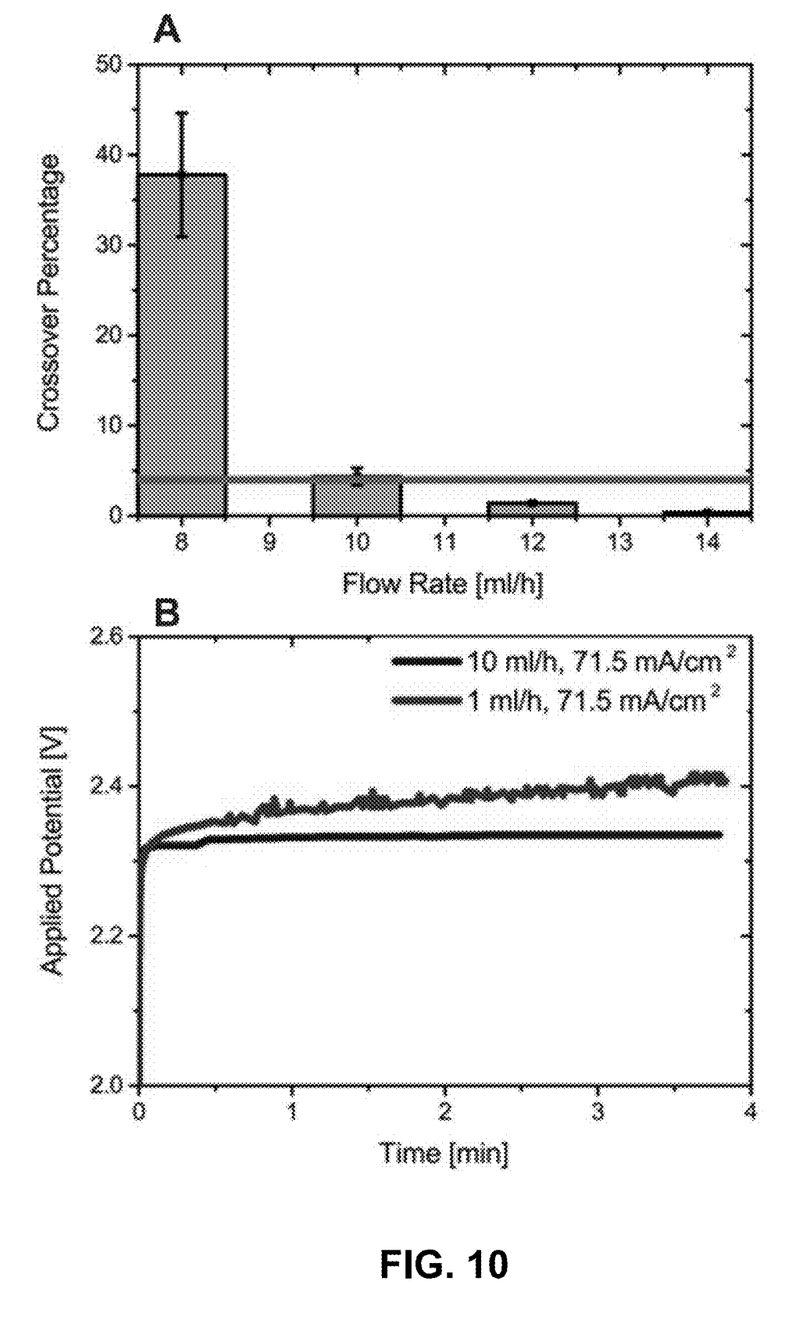
FIG. 10A shows gas crossover as a function of flow rate at 71.5 mA/cm$^2$, as the flow rate increases the mixing mechanism changes from convection of bubbles to diffusion of dissolved gases, larger drag force reduces the size of bubbles while an inertial lift force keeps the two bubble streams apart at the same time.
FIG. 10B shows that at low flow rates, the cell voltage fluctuates in order to keep the current density constant, this is due to the changing ionic resistance as the gases displace the electrolyte in the center of the channel.

As previously mentioned, the biggest challenge with a membrane-less electrolyzer is to avoid product mixing which lowers device's efficiency, product's purity and results into a potentially unsafe operation. FIG. 10A shows gas crossover measurements after running the device at 71.5 mA/cm² with 1 M sulfuric acid for 90 minutes. The bottom line shows a maximum allowable crossover for producing a non-flammable gas stream, and at flow rates above 12 ml/h the cross contamination is well below this 4% cross contamination threshold.

Additionally, volumetric measurements indicate collection efficiencies of up to 91% of $H_2$ and 93% of $O_2$ at the outlets of the device. The high collection efficiencies demonstrate minimal losses of the gases due to dissolution in the electrolyte and imperfections in the collection ports. This also indicates that if the electrolyte were to be recycled, the faradaic efficiency would only drop a few percentage points as a consequence of the recombination of the dissolved gases at the electrodes.

At 12 ml/h and 71.5 mA/cm², the ratio between convective flow of $H_2$ along the channel to its diffusive flow across the channel, predicted by the Peclet number, is higher than $4.7 \times 10^3$. In addition, the ratio between the $H_2$ generation rate and the diffusive flow across the channel is $1.3 \times 10^8$. These values show that the $H_2$ diffusion rate across the electrodes is negligible compared to generation and convective transport rate, indicating that the device is functioning in an appropriate set of operation parameters for purified fuel production, i.e. velocity and current density.

The fact that the measured gas crossover is higher than these predicted values suggests that gas mixing in the devices predominantly happens through perturbations that cause convective transport of bubbles across the channel. These perturbations also lead to instabilities in the device electrochemical performance, especially at lower flow rates as observed in FIG. 10B. When devices operate at low flow rates, bubbles fill the inter-electrode space, increasing the ionic resistance in the device and resulting in fluctuations in the applied potential required to maintain a constant current density. At higher flow rates, the migration of bubbles across the channels is reduced and the ionic resistance between the two electrodes remains constant, resulting in stable operation.

While requiring high flow rates for gas separation increases the energy required for pumping the fluids, the pumping power requirement is estimated to be only 5% of the generated power when the device is operated at 71.5 mA/cm² and 12 ml/h. These low levels of pumping power can be further reduced by optimizing the channel dimensions in the device.

The membrane-less electrolyzer of the present invention thus has the ability to produce non-flammable hydrogen streams, continuously and stably across the pH scale. Comparing the device ohmic resistance with that for Nafion-based devices, it is clear that this device has the potential to surpass the performance of similar water splitting apparatus that rely on ion conductive membranes for separation.

Although a single electrode pair can only produce a limited amount of fuel, scaling it out can be achieved on multi-stack panels for enhanced throughput or the implementation of large area electrodes. The design simplicity of this membrane-less electrolyzer can facilitate mass production, especially by employing high resolution 3D printers or injection moulding techniques.

Figure 5:
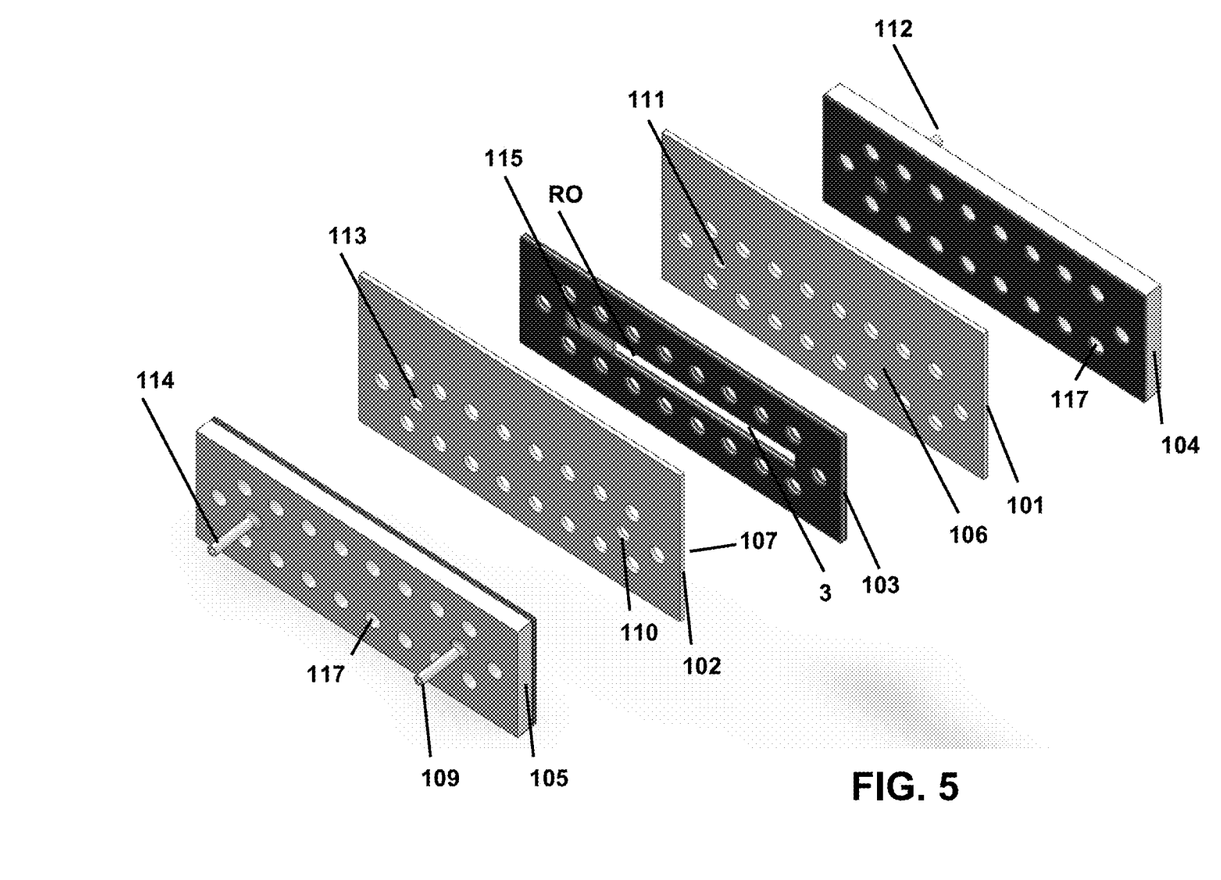
FIG. 5 is an exploded view of an exemplary membrane-less electrolyzer according to the present invention.

FIG. 5 is an exploded view of another exemplary embodiment of the membrane-less electrolyzer according to the present invention.

FIG. 5 shows a modular design of a large scale version of the electrolyzer. The device includes an anode plate 101, cathode plate 102 and a flow plate 103, and a first plate 104 and a second plate 105 providing fluidic connections.

The anode plate 101 includes an electrode zone on a first side 106 of the anode plate 101 defining a first electrode and the cathode plate 102 includes an electrode zone on a first side of the cathode plate 102 defining a second electrode. The first and second electrodes include a catalyst (for example, the electrode zones are fully or partially coated with an appropriate catalyst) and after assembly define and act as the side walls of fluidic channel 3. The flow plate 103 includes a substantially rectangular shaped opening RO that is enclosed by the anode plate 101 and the cathode plate 102 once assembled. Once assembled, the electrode zones make up the side walls of the fluidic channel 3.

The widths of anode 101 and cathode 102 plates are longer than the other pieces to provide access for electrical connection after assembly.

The liquid electrolyte is introduced to the fluidic channel 3 through inlet port 109 and hole 110 that are substantially aligned with each other and with the rectangular shaped opening RO. In the case where the electrolyte is for example water, a mixture of the oxygen gas and electrolyte go out the device through hole 111 and outlet port 112 whereas mixture of hydrogen gas and electrolyte go out of the device from hole 113 and outlet port 114. The hole 111 and outlet port 112 are substantially aligned with each other and with the rectangular shaped opening RO. The hole 113 and outlet port 114 are substantially aligned with each other and with the rectangular shaped opening RO.

Optionally, the two gas streams are separated physically by a separator 115 before reaching the holes 111 and 113. The separator 115 is thinner that the thickness of the flow plate 103, for example, 60% thinner and positioned centrally inside the rectangular shaped opening RO so that the gases and electrolyte can flow either side of the separator 115. The separator is there to separate the two streams before reaching to the two outlet holes (11 and 13). The separator 115 prevents agitation of the flow pattern at the end of the channel 3 and decreases the probability of the gas crossover.

The different plates further include a plurality of holes 117 devised at the periphery of all parts for passing screws to receive nuts or passing other attachment means therethrough to assembly and hold the device together.

The anode and cathode plates are for example made of metal, for example titanium, and coated partially (in the electrode zone) with one or more thin films of an appropriate catalyst, for instance platinum and iridium oxide, by means of techniques such as electroplating, sputtering, ebeam evaporation, etc.

Preferably, these plates are not coated where they face the beginning of the fluidic channel 3 at or close to the hole 110, since the flow velocity profile is not hyperbolic yet at the beginning of the fluidic channel 3. The coating starts at a length which is approximately 10 times larger than the hydraulic diameter of the fluidic channel 8. This length ensures the formation of a fully developed flow with hyperbolic profile. The coating preferably finishes when the electrode plates face the separator 115.

The anode, cathode and flow plates as well as the plates for fluidic connections can be 3d printed, molded, or stamped in plastic, or metal. In FIG. 5, brighter shaded parts are preferably made out of rigid or stiff material and the darker shaded parts out of relative less rigid or flexible material with sealing properties. The inter-electrode distance or the distance between the fluidic channel 3 side walls, i.e. the thickness of flow plate 3, can have a value mentioned previously above. The flow is preferably kept laminar and, therefore, the Reynold number should not exceed 2300. The height and the length of the channel 3 (rectangular shaped opening RO) can have a value that each range from micron to meter scale depending on the application and required throughput. After manufacturing all the parts, they are assembled in the order shown in FIG. 5 through, for example, several screws and nuts to provide tight sealing.

The electrolyzer may also include an electrolyte fluid insertion and removal system as described above with respect to the electrolyzer of FIGS. 3A and 3B.

Figure 6:
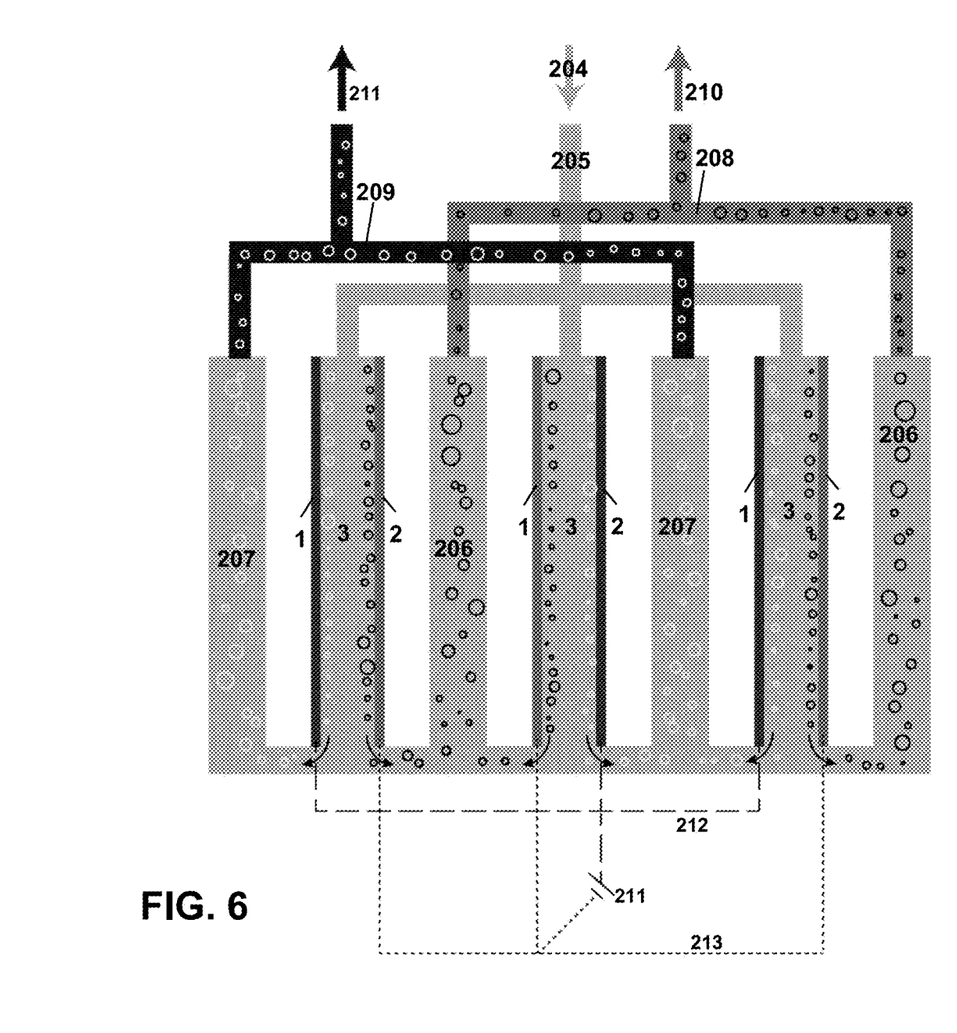
FIG. 6 illustrates an exemplary configuration for connecting a plurality of electrolyzers according to the present invention in a stack.

FIG. 6 illustrates an exemplary configuration for connecting a plurality of electrolyzers according to the present invention in a stack or array.

This stack includes for example three electrolyzer units according to the present invention (as illustrated for example in FIGS. 3A, 3B, and 5) where the anode electrodes 1 and cathode electrodes 2 face each other in fluidic channel 3. The liquid electrolyte is introduced into the system through an inlet port 204 and distributed in between the units through the fluid communication or piping network 205. If the electrolyte is water, the evolved hydrogen and oxygen gases mixed with electrolyte enter the dedicated channels 206 and 207 at the downstream and then are guided through collection piping networks 208 and 209 towards outlets 210 and 211 (along with the electrolyte). The cathode and anode electrodes are connected electrically to the power source 211 through wiring networks 212 and 213.

Concerning the device of FIG. 5, port 109 connects to the piping network 205 of FIG. 6 and each of the ports 112 and 114 connect to the piping networks 208 and 209 through channels 206 and 207 in FIG. 5.

A schematic illustration of the membrane-less electrolyzer according to a further embodiment of the present invention is shown in FIGS. 4A to 4D.

In the exemplary embodiment illustrated in FIGS. 4A to 4D, the device includes electrodes 11, 12 as well as electrolyte microchannel 13, microholes or microstructures 14a, 14b and gas channels or compartments 15a, 15b in fluid communication with gas outlet 16a, 16b. The electrolyzer is a 3D device comprising a first layer L1 and a second layer L2.

The device further includes at least one electrolyte inlet port 17 and at least one electrolyte outlet port 18.

The device may include a system configured to insert electrolyte fluid through inlet port 17 and remove an electrolyte fluid through outlet ports 18. The electrolyzer may include an electrolyte fluid insertion and removal system as described above with respect to the electrolyzer of FIGS. 3A and 3B.

The aspect ratio~height to width~of the first layer's (L1) channel 13 is lower than one. When enough voltage (operational voltage equal or greater than a threshold voltage $V_T$, for example, a voltage >1.23V) is applied to the electrodes 11, 12, the gas bubbles form and get released into the channel 13 due to buoyancy. Before mixing together in the first layer L1 and channel 13, the bubbles reach to the top side of the first layer L1 and enter the second layer L2 through an array 14a, 14b of fabricated microholes or microstructures. The dimensions of the microholes 14a, 14b (for example, 1 µm to 1 mm in diameter and 100 µm to 2 cm in length), fluidic channel 13 (for example, 200 µm to 5 mm in width, 20 µm to 500 µm in height, and 1 cm to 5 cm in length) and electrode 11, 12 separation (for example, 80 µm to 1 mm) are such that the gases remain unmixed before entering the second layer L2. The electrolyte can be provided at a rate larger than the consumption rate at the electrodes.

As in the previous design of the first embodiment of FIGS. 3A and 3B, the electrodes can alternatively be deposited on the side walls SW of the fluidic channel 13. In the second layer L2, there is a solid barrier 19 which prohibits the gases to get mixed with each other.

Advantageously, the use of such a 3D printer is specifically useful for producing the device of this second embodiment relating to the 3D superposed electrolyzer design.

Other manufacturing technologies such as injection molding and laser stereolithography which are able to deliver the required resolution can be alternatively utilized for (mass) production of these devices.

The device can be modular and assembly of various modules is done using a (precise) aligner tool.

The designs of the embodiments described here can be scaled out for high throughput gas production. Scale up of the designs is also possible as long as the flow is laminar and enough cross flow inertial force is provided.

According to another aspect of the present invention, the device described above in relation to the embodiment illustrated in FIGS. 4A-4D advantageously is a degassing device when the electrodes 11, 12 (and any connections thereto) are removed. The degassing device is identical to the electrolyzer of FIGS. 4A-4D except that the electrodes 11, 12 (and any ports and connections to these electrodes) are absent.

A bubbly flow (fluid comprising one or more gases) enters the device, for example, via inlet port 17 and exits via outlet port 18. The gas bubbles get separated from the fluid by the microhole array 14a, 14b and the separated gas is transferred to outlet ports 16a, 16b via channels or compartments 15a, 15b.

Having described now the preferred embodiments of this invention, it will be apparent to one of skill in the art that other embodiments incorporating its concept may be used. This invention should not be limited to the disclosed embodiments, but rather should be limited only by the scope of the appended claims.

In particular, the present invention is not limited to a device for processing water to release hydrogen and oxygen gases. Other electrochemical reactions producing other gases can also be processed by the device of the present invention. Other examples of such electrochemical reactions are, but not limited to: $CO_2$ reduction in aqueous electrolytes for the production of methane, carbon monoxide, alkanes, aldehydes, carboxylic acids, alcohols; production of chlorine, sodium hydroxide and hydrogen from sodium chloride solutions.

In this case, in the electrolyzer of the above described embodiments, the first and second electrodes permit to produce an oxidation product and a reduction product inside the fluidic channel from a reactant in a fluid introduced into the fluidic channel. A reactant in the fluid stream decomposes into oxidation and reduction products at the anode and the cathode respectively.

The oxidation product is transported to the first fluid outlet and the reduction product is transported to the second fluid outlet. The oxidation product can be a gas or a fluid and the reduction product can be a gas or a fluid. For example, in electrochemical $CO_2$ reduction to alcohols, a liquid is produced at the cathode and $O_2$ gas at the anode.

It should be noted that the above mentioned features and characteristics described in detail with respect to the embodiment of FIGS. 3A and 3B are features and characteristics that can be included in the other later described embodiments of the electrolyzer of the present invention.

The invention claimed is:

1. A membrane-less electrolyzer comprising:
a fluidic channel including a first wall, a second wall, and a bottom floor that is in contact with the first and second walls and extending therebetween, the fluidic channel configured to receive and guide an electrolyte fluid;
a first electrode and a second electrode located inside the fluidic channel, the first and second electrode permitting to extract a first gas and a second gas inside the fluidic channel from the electrolyte fluid, the first electrode and second electrode being separated by a surrounding fluid in the fluidic channel or the electrolyte fluid;
an electrolyte inlet located upstream of the fluidic channel and configured to provide the electrolyte fluid to the fluidic channel;
a first outlet located downstream of the fluidic channel configured to receive the first gas and the electrolyte fluid; and
a second outlet located downstream of the fluidic channel configured to receive the second gas and the electrolyte fluid,
wherein the first wall extends to the first outlet to delimit the first outlet and the second wall extends to the second outlet to delimit the second outlet, the second outlet facing the first outlet such that an expelling direction of the first gas and the electrolyte fluid at the first outlet is different from an expelling direction of the second gas and the electrolyte fluid at the second outlet,
wherein the first and second electrodes each define continuous elongated electrodes extending both separately and side-by-side inside the fluidic channel, the first and second elongated electrodes each having a continuously exposed electrolysis surface, and
wherein the first and second electrodes are separated by an inter-electrode separation distance that lies in a range of 5 mm>d≥50 µm.

2. The membrane-less electrolyzer according to claim 1, wherein the range is 500 µm≥d≥50 µm.

3. The membrane-less electrolyzer according to claim 1, wherein the fluidic channel includes an enclosed fluidic channel.

4. The membrane-less electrolyzer according to claim 1, further comprising:
a mechanism for guiding fluids configured to generate a force by a guided flow of the electrolyte fluid in the fluidic channel, the force acting on the first and second gas to confine the first and second gases to opposing sides of the fluidic channel.

5. The membrane-less electrolyzer according to claim 1, wherein the the inter-electrode separation distance or the wall separation distance is configured to cause a laminar fluid flow of the electrolyte in the fluidic channel.

6. The membrane-less electrolyzer according to claim 5, wherein the range is 200 µm>d>50 µm.

7. The membrane-less electrolyzer according to claim 1, further comprising:
an electrolyte fluid insertion and removal system configured to generate a hyperbolic electrolyte flow profile across the fluidic channel from the first wall to the second wall.

8. The membrane-less electrolyzer according to claim 1, wherein the membrane-less electrolyzer is planar or forms an in-plane membrane-less electrolyzer.

9. The membrane-less electrolyzer according to claim 1, wherein the first electrode and the second electrode are located on the bottom floor of the fluidic channel.

10. The membrane-less electrolyzer according to claim 1, wherein the first electrode and the second electrode are located on the first wall and the second wall, respectively, of the fluidic channel.

11. The membrane-less electrolyzer according to claim 1, further comprising:
a first fluidic transport channel arranged between the fluidic channel and the first outlet, forming a part of the extended first wall; and
a second fluidic transport channel arranged between the fluidic channel and the second outlet, forming a part of the extended second wall,
wherein the first fluidic transport channel and the second fluidic transport channel include a plurality of microstructures located on a ceiling of the fluidic channel.

12. The membrane-less electrolyzer according to claim 1, further comprising:
a first fluidic transport channel arranged between the fluidic channel and the first outlet, forming a part of the extended first wall; and
a second fluidic transport channel arranged between the fluidic channel and the second outlet, forming a part of the extended second wall,
wherein the first fluidic transport channel and the second fluidic transport channel include at least one of a plurality of micro-holes and a plurality of micro-conduits located on the ceiling of the fluidic channel permitting fluidic communication between the fluidic channel and the first and second fluidic transport channels.

13. The membrane-less electrolyzer according to claim 11, further comprising:
a barrier to separate and guide the gases to the respective first and second outlets.

14. The membrane-less electrolyzer according to claim 11, wherein the first electrode and the second electrode are located on the bottom floor of the fluidic channel or on the first wall and the second wall, respectively, of the fluidic channel.

15. The membrane-less electrolyzer according to claim 11, further comprising:
a first sealed fluidic channel between the first outlet and the first fluidic transport channel, and a second sealed fluidic channel between the second outlet and the second fluidic transport channel.

16. A method of operating a membrane-less electrolyzer as recited in claim 1,
the method comprising the steps of:
inserting the electrolyte fluid into the membrane-less electrolyzer;
applying an electrolysis voltage to the first and second electrodes to produce the first and the second gas; and
circulating the electrolyte fluid through the fluidic channel to transport the first gas to the first gas outlet and to transport the second gas to the second gas outlet.

17. The method of claim 16, further comprising the step of:
circulating the electrolyte fluid through the fluidic channel to provide a laminar fluid flow in the fluidic channel and a hyperbolic electrolyte flow profile across the fluidic channel between the first and the second side wall.

18. The method of claim 16, further comprising the step of:
modifying a fluid velocity of the electrolyte fluid circulating in the membrane-less electrolyzer to confine the first and second gases to opposing sides of the fluidic channel.

19. A membrane-less electrolyzer comprising:
a fluidic channel including a first wall, a second wall, and a bottom floor that is in contact with the first and second walls and extending therebetween, the fluidic channel configured to receive and guide a reactant in a fluid;
a first electrode and a second electrode located inside the fluidic channel, the first and second electrode configured to produce an oxidation product and a reduction product inside the fluidic channel from a reactant in the fluid, the first electrode and second electrode being separated by a surrounding fluid in the fluidic channel or the reactant in the fluid;
an inlet located upstream of the fluidic channel and configured to provide the reactant in the fluid to the fluidic channel,
a first outlet located downstream of the fluidic channel configured to receive the first gas and the electrolyte fluid; and
a second outlet located downstream of the fluidic channel configured to receive the second gas and the electrolyte fluid,
wherein the first wall extends to the first outlet to delimit the first outlet and the second wall extends to the second outlet to delimit the second outlet, the second outlet facing the first outlet such that an expelling direction of the reactant in the fluid and the oxidation product at the first outlet is different from an expelling direction of the reactant in the fluid and the reduction product at the second outlet,
wherein the first and second electrodes each define continuous elongated electrodes extending both separately and side-by-side inside the fluidic channel, the first and second elongated electrodes each having a continuously exposed electrolysis surface, and
wherein the first and second electrodes are separated by an inter-electrode separation distance that lies in a range of 5 mm>d≥50 μm.

20. The membrane-less electrolyzer of claim 19, wherein the oxidation product is a gas or a fluid and the reduction product is a gas or a fluid.

21. The membrane-less electrolyzer according to claim 19, wherein the first electrode and the second electrode are located on the bottom floor of the fluidic channel or on the first wall and the second wall, respectively, of the fluidic channel.

22. The membrane-less electrolyzer according to claim 19, wherein the range is 500 μm≥d≥50 μm.

* * * * *